United States Patent [19]

Eiden

[11] Patent Number: 4,794,909
[45] Date of Patent: Jan. 3, 1989

[54] SOLAR TRACKING CONTROL SYSTEM

[76] Inventor: Glenn E. Eiden, 302 U.S. 30, E., New Haven, Ind. 46774

[21] Appl. No.: 40,368

[22] Filed: Apr. 16, 1987

[51] Int. Cl.$^4$ ................................................. F24J 3/02
[52] U.S. Cl. ................................... 126/425; 126/422; 126/437; 353/3
[58] Field of Search ............... 126/424, 425, 419, 422, 126/437; 250/203 R; 353/3; 364/516; 318/567

[56] References Cited

U.S. PATENT DOCUMENTS

| | | | |
|---|---|---|---|
| 4,019,495 | 4/1977 | Frazier et al. | 126/422 |
| 4,031,385 | 6/1977 | Zerlaut et al. | 250/203 R |
| 4,054,124 | 10/1977 | Knoos | 126/419 |
| 4,060,195 | 11/1977 | Rapp, Jr. et al. | 126/419 |
| 4,158,354 | 6/1979 | Carden | 126/424 |
| 4,215,410 | 7/1980 | Weslow et al. | 126/424 |
| 4,266,530 | 5/1981 | Steadman | 126/424 |
| 4,287,411 | 9/1981 | Beucci | 250/203 R |
| 4,296,737 | 10/1981 | Silk | 126/424 |
| 4,314,545 | 2/1982 | Bowman | 126/424 |
| 4,334,521 | 6/1982 | Jacoby | 126/425 |
| 4,391,268 | 7/1983 | Mathes et al. | 126/437 |
| 4,399,807 | 8/1983 | Buckley et al. | 126/419 |
| 4,401,494 | 4/1984 | Hattan | 126/425 |
| 4,476,853 | 10/1984 | Arbogast | 126/425 |
| 4,519,382 | 5/1985 | Gerwin | 126/425 |
| 4,536,847 | 8/1985 | Erickson et al. | 364/516 |
| 4,546,756 | 10/1985 | Leroy et al. | 126/424 |

Primary Examiner—Samuel Scott
Assistant Examiner—Noah Kamen
Attorney, Agent, or Firm—George Pappas

[57] ABSTRACT

A solar tracking control system for generally controlling the position of a pivotable solar panel connected to a motor by selectively energizing and de-energizing the motor. A signal programmer generates a plurality of time dependent signals wherefrom periodic motor energizing signals are generated for retaining the motor energized and the solar panel pivoting westerly. The degree of pivot of the solar panel is detected and a de-energizing signal is provided for stopping the motor and the westerly pivoting of the solar panel. The solar tracking control system is energized and de-energized in response to a power signal generated by signals received from the signal programmer. A water storage tank is connected to the solar panel and a water pump connected therebetween is energized on the occurrence of a preselected temperature different between the solar panel and the water storage tank. An east/west signal is generated in response to the time dependent signals received from the signal programmer and is connected to switches which are also connected to an overload determining temperature sensitive switch so as to pivot the solar panel away from direct sunlight in response to the determination of an overload condition.

23 Claims, 5 Drawing Sheets

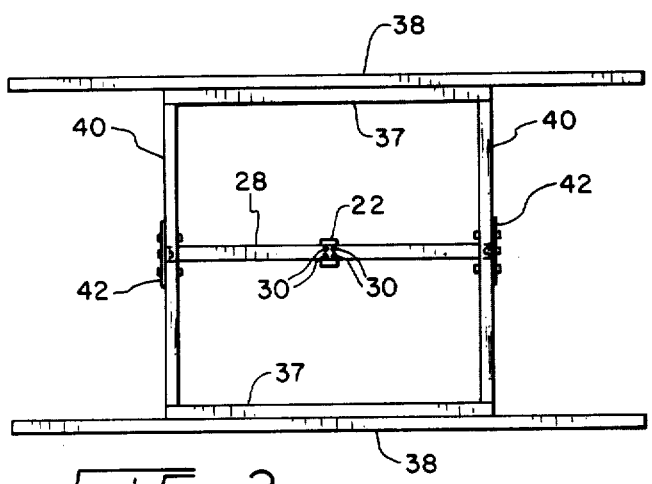
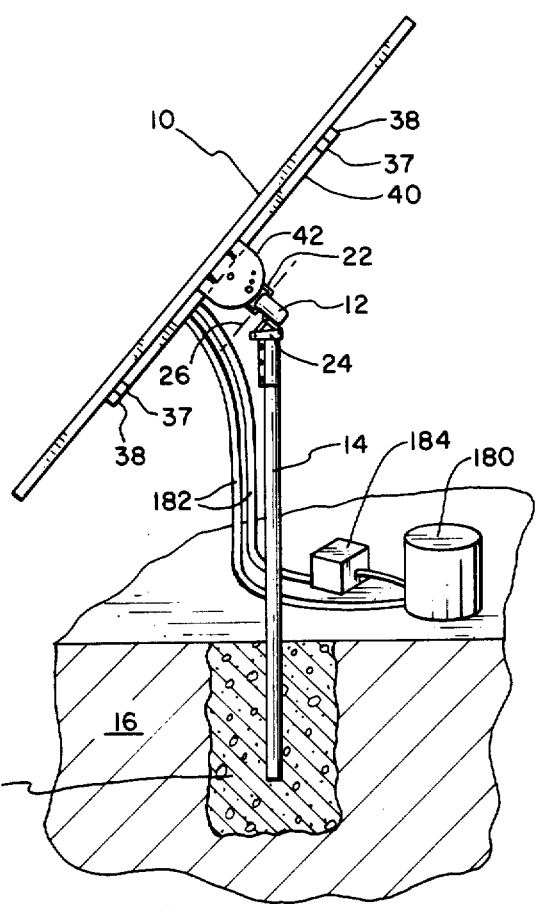
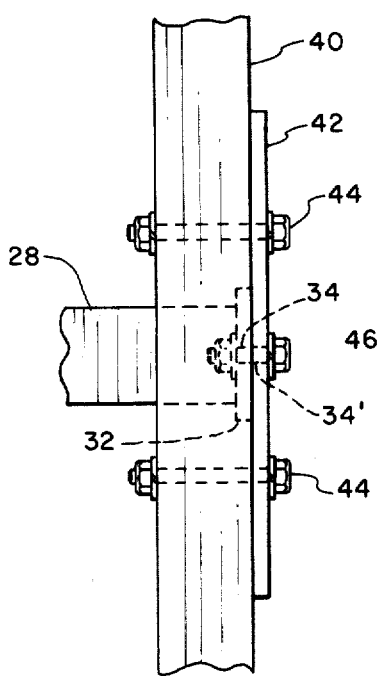
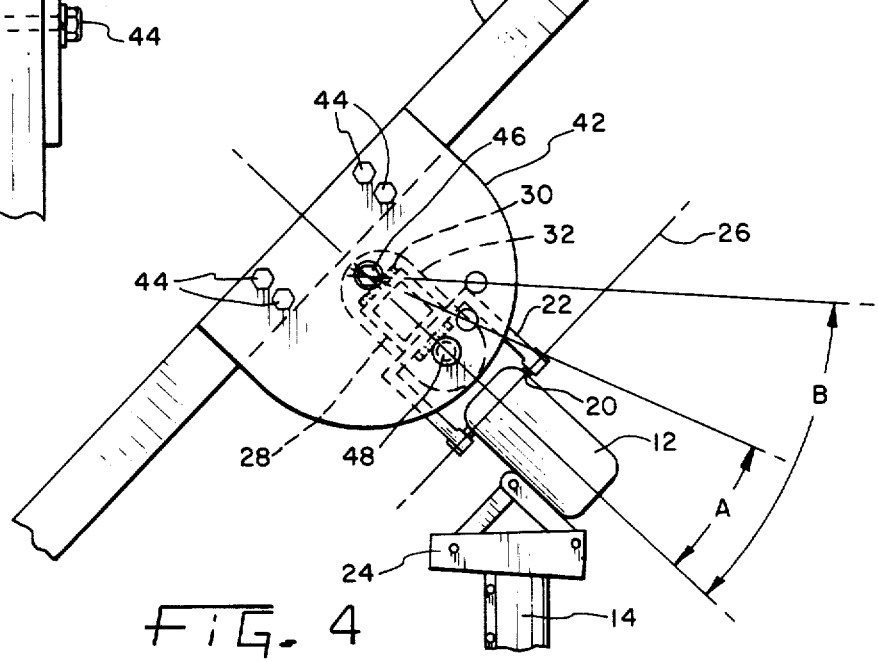

SOLAR TRACKING CONTROL SYSTEM

BACKGROUND OF THE INVENTION

The present invention relates to a solar tracking control system for controlling the position of a solar panel so that the solar panel is generally situated substantially perpendicular to the sun.

In recent times, due to energy shortages, it has become increasingly common to seek for alternative energy sources. One such energy source is the sun. Solar panels, or collectors, have become commercially available for the purpose of drawing energy from the sun and using that energy to heat water, air, or other mediums. Other types of solar panels include photovoltaic devices which directly create electrical energy from the sun's rays. Naturally, the collected energy is thereafter often stored in some sort of energy bank and used for heating homes, water supplies, and powering various electrical devices, etc.

It is known that solar panels are most efficient in collecting the sun's energy when they are situated substantially perpendicular to the sun. Further, it is known that the overall efficiency of the solar panels can be increased by pivoting the panels throughout the day so that they are generally continually situated substantially perpendicular to the sun. In this fashion, efficiency is increased and the number of solar panels for any particular purpose is decreased thereby also decreasing the overall cost of the system.

Various mechanisms and methods have been developed for controlling the pivoting of solar panels so as to generally continually situate the solar panels perpendicular to the sun. The prior art solar tracking systems mostly depend on an optical system which will degrade with time due to the sun's rays, and they require adjustment periodically. They tend to be inefficient and prone to break down because very often, common motor clocks, mechanical parts and contacts are utilized for positioning the solar panels. Further, other systems are set up to continuously run or operate and, therefore, consume energy needlessly ahd are also more likely to break down over a period of time.

It is, therefore, the object of this invention to provide a solar tracking control system wherein the solar position is tracked in an efficient minimum energy consuming manner under any cloud condition. Further, it is the object of this invention to track the solar position in a time dependent fashion only in a westerly direction during the day so as to eliminate backtracking which has often occurred with systems utilizing photosensors. Further yet, it is the object of the present invention to provide an inexpensive and yet accurate solar tracking control system minimizing mechanical parts so as to decrease the probability of breakdown.

SUMMARY OF THE INVENTION

The solar tracking control system, according to the present invention, is designed to overcome the above-discussed disadvantages associated with prior art solar tracking systems.

The solar tracking control system generally controls the position of a pivotable solar panel by selectively energizing and de-energizing a motor which is connected to the solar panel. The pivot axis of the solar panel is situated substantially parallel to the earth's axis of rotation. A time controlled signal programmer is provided for generating a plurality of time dependent signals which are, thereafter, utilized in generating the various control signals. The signal programmer is time dependent via a 60 Hz input from a regular house outlet. A means for generating periodic motor energizing signals generally including various gates is provided and causes a cross coupled NAND gate cell to latch and, thereby, retain the motor energized and the solar panel pivoting in the westerly direction. A means for detecting the degree of pivot of the solar panel generally including a hall effect generator and sensor and a counter is provided so as to detect a preselected degree of pivot and reset the cross coupled NAND gate cell thereby de-energizing the motor and stopping the westerly pivoting of the solar panel. The counter resets itself when resetting the NAND gate cell thereby preparing itself for the next count. This process of generating a motor energizing signal, causing the solar panel to pivot and stopping the pivoting of the solar panel in response to the counter providing a de-energizing signal is repeated throughout a period during which a fixed automatic signal is at zero or low thereby causing the solar panel to pivot westerly generally following the sun during the period of which the fixed automatic signal is zero.

The solar tracking control system is energized and deenergized in response to a power signal which is generated by a power signal generating means which operates in response to a plurality of time dependent signals received from the signal programmer. In essence, a power switch means which includes a coil and contacts are utilized for selectively providing electrical power to the solar tracking control system in response to the power signal.

The solar panel is connected to an energy bank such as a water storage tank for holding the energy collected by the solar panels and a means for transferring the energy from the solar panels to the energy bank, such as a water pump, is provided. An east/west signal generating means is connected to the signal programmer and generates an east/west signal in response to a plurality of time dependent signals received from the signal programmer. An overload determining means such as a temperature sensitive switch is connected to the storage tank or the energy bank such as a water storage tank so as to determine an overload, such as the occurrence of exceeding a preselected temperature or the occurrence of an overvoltage condition of an electrical storage bank. A switch means is provided and is connected to the east/west signal generating means capable of overriding the latch means and pivoting the solar panel away from direct sunlight in response to an overload determination and in response to the east/west signal. A water pump may be fluidly connected between a water storage tank and the solar panel and can be selectively energized so as to transfer heat collected by the solar panel to the water storage tank upon the occurrence of a preselected temperature difference between the solar panel and the water storage tank.

The present invention overcomes the prior art disadvantages by substantially eliminating mechanical parts. Thus, the overall solar tracking system is less prone to breakdown. Further, the solar tracking control system is more efficient to operate in that it is energized only when needed during daylight. Further, by utilizing low energy consumption electrical parts, overall efficiency is also increased in that when the solar tracking control system is energized, a minimal amount of energy is consumed. In general, the solar tracking control system is efficient because during the day, solar tracking occurs in a time dependent fashion only in the westerly direction and the solar panel is not permitted to back track unless an overtemperature or overload condition occurs such that direct sunlight must be avoided. Further yet, the solar tracking control system of the present invention, by utilizing electrical integrated circuitry and by utilizing a signal programmer dependent on a common 60Hz outlet, is generally inexpensive and yet substantially accurate.

In one form thereof, the present invention relates to a solar tracking control system for use in controlling the position of a pivotable solar panel connected to a motor by selectively energizing and de-energizing the motor. The control system includes a means for generating periodic motor energizing signals and a means for detecting the degree of pivot of the solar panel and for providing a motor de-energizing signal in response to detecting a preselected degree of pivot. A latch means is also provided and is connected to the detecting means and the generating means and to the motor for retaining the motor energized in response to a motor energizing signal and retaining the motor de-energized in response to a de-energizing signal.

In one form thereof, the present invention relates to a solar tracking control system for use in controlling the position of a pivotable solar panel connected to a motor by selectively energizing and de-energizing the motor. The control system includes time-controlled signal programmer means for generating a plurality of time dependent signals. A means is connected to the signal programmer means for generating periodic motor energizing signals. A means for detecting the degree of pivot of the solar panel and for providing a motor de-energizing signal in response to detecting a preselected degree of pivot is provided. The means for detecting includes a hall sensor connected to the motor having a hall sensor output in response to the motor operation and a counter connected to the hall sensor. The counter provides the de-energizing signal in response to the hall sensor output. A latch means is connected to the detecting means and the motor energizing signal generating means and to the motor for retaining the motor energized in response to a motor energizing signal and retaining the motor de-energized in response to a de-energizing signal.

In one form thereof, the present invention relates to a method for controlling the position of a pivotable solar panel connected to a motor and having a pivot axis substantially parallel to the earth's axis of rotation. The method includes the steps of energizing a solar tracking control system with a switch actuated in response to a time dependent power signal; generating a motor energizing signal and, thereby, energizing the motor and causing the solar panel to pivot about the pivot axis; detecting the degree of pivot caused by the energizing of the motor; generating a motor de-energizing signal in response to detecting a preselected degree of pivot and thereby causing the motor and the solar panel to stop; repeating the steps of generating a motor energizing signal detecting the degree of pivot and generating a motor de-energizing signal in a time dependent manner thereby causing the solar panel to continually pivot and be substantially perpendicular to the sun; and, de-energizing the solar tracking control system in response to the time dependent power signal.

BRIEF DESCRIPTION OF THE DRAWINGS

The above-mentioned and other features and objects of this invention and the manner of attaining them will become more apparent and the invention itself will be better understood by reference to the following description of an embodiment of the invention, taken in conjunction with the accompanying drawings wherein:

FIG. 1 is a side elevational view of a solar energy collector system utilizing a solar panel, a water pump and a water storage tank according to the present invention;

FIG. 2 is a top plan view of the frame of the solar collector mount shown in FIG. 1;

FIG. 3 is a blown up top plan view of a portion of the frame shown in FIG. 1;

FIG. 4 is a blown up side elevational view of the collector frame and motor shown in FIG. 1 and showing more clearly the pivoting of the solar panel to accommodate the various seasons;

Corresponding reference characters indicate corresponding parts throughout the several views of the drawings.

Figure 5A:
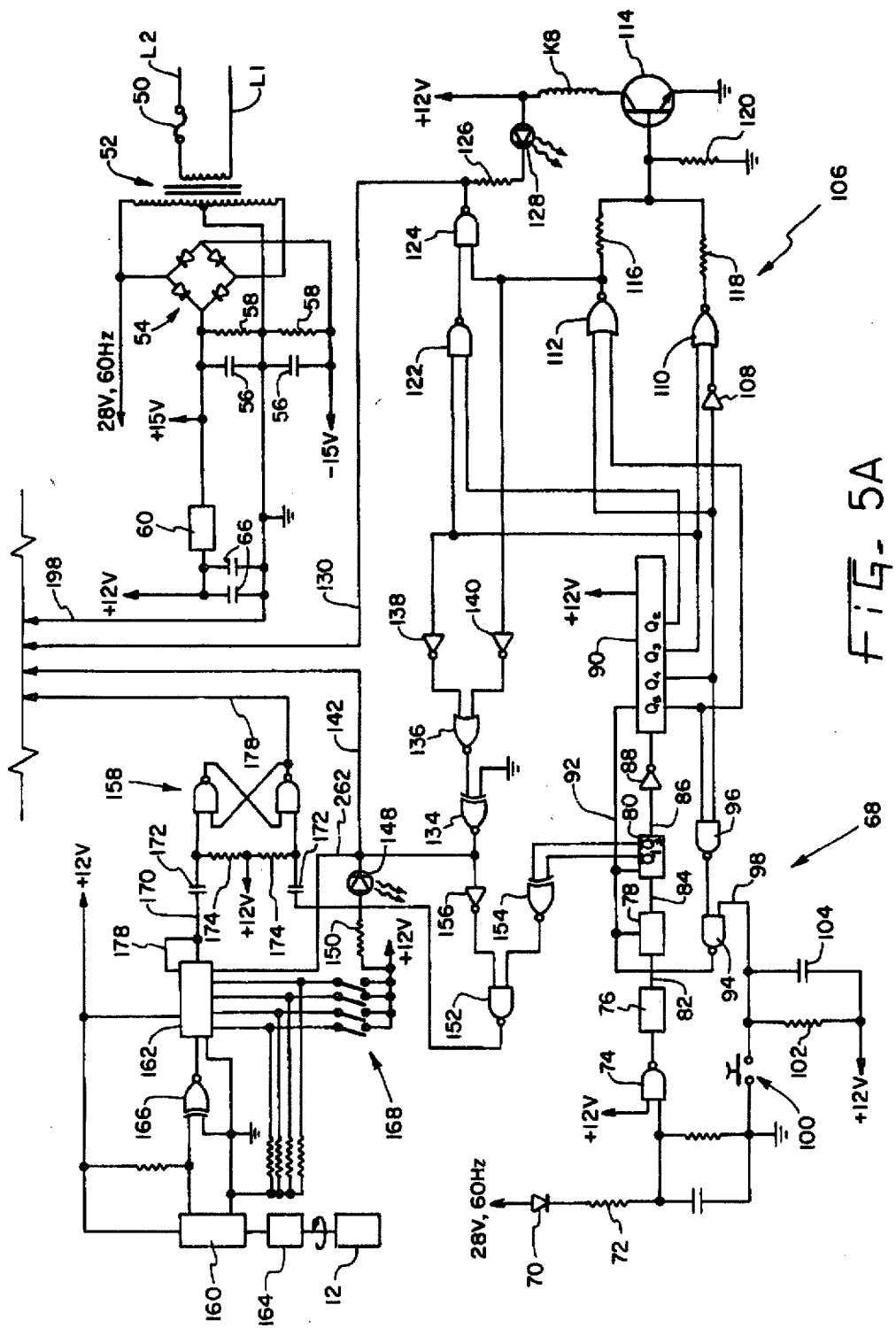
FIGS. 5a and 5b are an electrical schematic of the solar tracking control system according to the present invention for controlling the pivoting of the solar collector shown in FIG. 1 about the pivot axis which is situated substantially parallel to the earth's axis of rotation.

The exemplifications set out herein illustrate a preferred embodiment of the invention in one form thereof and such exemplifications are not to be construed as limiting the scope of the disclosure or the scope of the invention in any manner.

DETAILED DESCRIPTION OF A SPECIFIC EMBODIMENT

As shown in the figures, a specific embodiment of the present invention is a solar tracking control system for use in controlling the position of a pivotable solar panel connected to a motor by selectively energizing and de-energizing the motor. More specifically, a solar panel 10 is provided for collecting the sun's energy and is pivotally mounted to a motor 12, which in turn is connected to a post 14. Post 14 is embedded in the ground 16 through the use of concrete 18 or, in other suitable fashions. Post 14 is mounted substantially perpendicular to the earth's surface.

As more clearly shown in FIGS. 2-4 and 8, motor 12 has a rotating shaft 20 upon which there is mounted U-member 22. Motor 12 is mounted upon post 14 through the use of a motor mounting base 24 and so that the axis 26 of motor shaft 20 is situated directionally north/south or, substantially parallel to the earth's axis of rotation. Accordingly, U-member 22 and solar panel 10, connected to shaft 20, rotate substantially parallel to the earth's axis of rotation.

Figure 7:
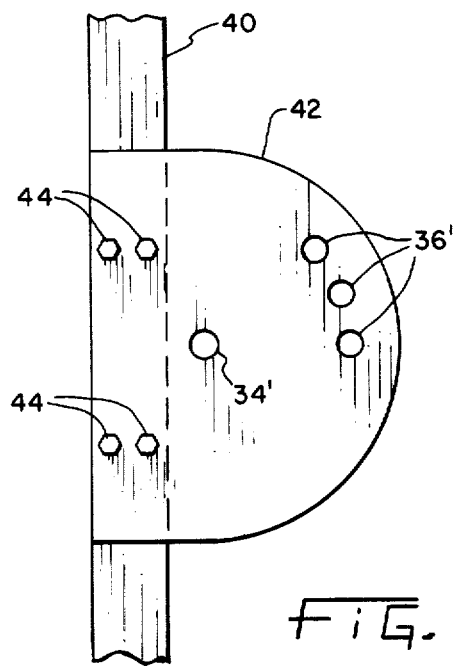
FIG. 7 is a side elevational view of the frame portion shown in FIG. 3.
Figure 8:
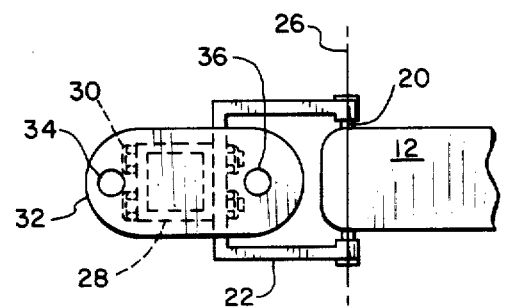
FIG. 8 is a side elevational view of the motor and oval member shown in FIG. 4.

As more clearly shown in FIG. 2, square bar member 28 is connected to U-member 22 through the use of bolts 30. On each end of square bar member 28, there is connected, by welding or other suitable means, an oval member 32. Each of the oval members 32 has a first hole 34 and a second hole 36 for the purpose of pivotally supporting solar panel 10 as described hereinbelow. More particularly, solar panel 10 is supported on a frame including horizontal beams 37 and 38 and vertical beams 40. Beams 37 and 40 are connected together to substantially form a square. Vertical beams 40 are connected to half circle plates 42 through the use of bolts 44. Half circle plates 42, as shown in FIG. 7, each have a pivot hole 34' corresponding with first holes 34 of oval members 32. Half circle plates 42 also have three angle displacement holes 36' for selectively corresponding with the second holes 36 of oval members 32. A pivot bolt 46 is received through each first hole 34 and pivot hole 34' thereby pivotally holding together oval members 32 and half circle plates 42 on each end of square bar member 28. Furthermore, angle displacement bolts 48 are received through each of the second holes 36 of oval members 32 and one of the angle displacement holes 36' of each of the half circle plates 42, as more clearly shown in FIG. 4. Accordingly, by placing the angle displacement bolts 48 in the various angle displacement holes 36', solar panel 10 can be pivoted so as to more substantially be perpendicular to the sun during the various seasons of the year. That is, in the north hemisphere, solar panel 10 may be pivoted to angle B generally during the summer months, to angle A generally during the spring and fall months, and in a position as shown in FIG. 4, generally during the winter months. So as to further increase efficiency, solar panel 10 is pivoted daily from east to west so as to be substantially perpendicular to the sun through the use of the solar tracking control system as described hereinbelow.

Figure 5B:
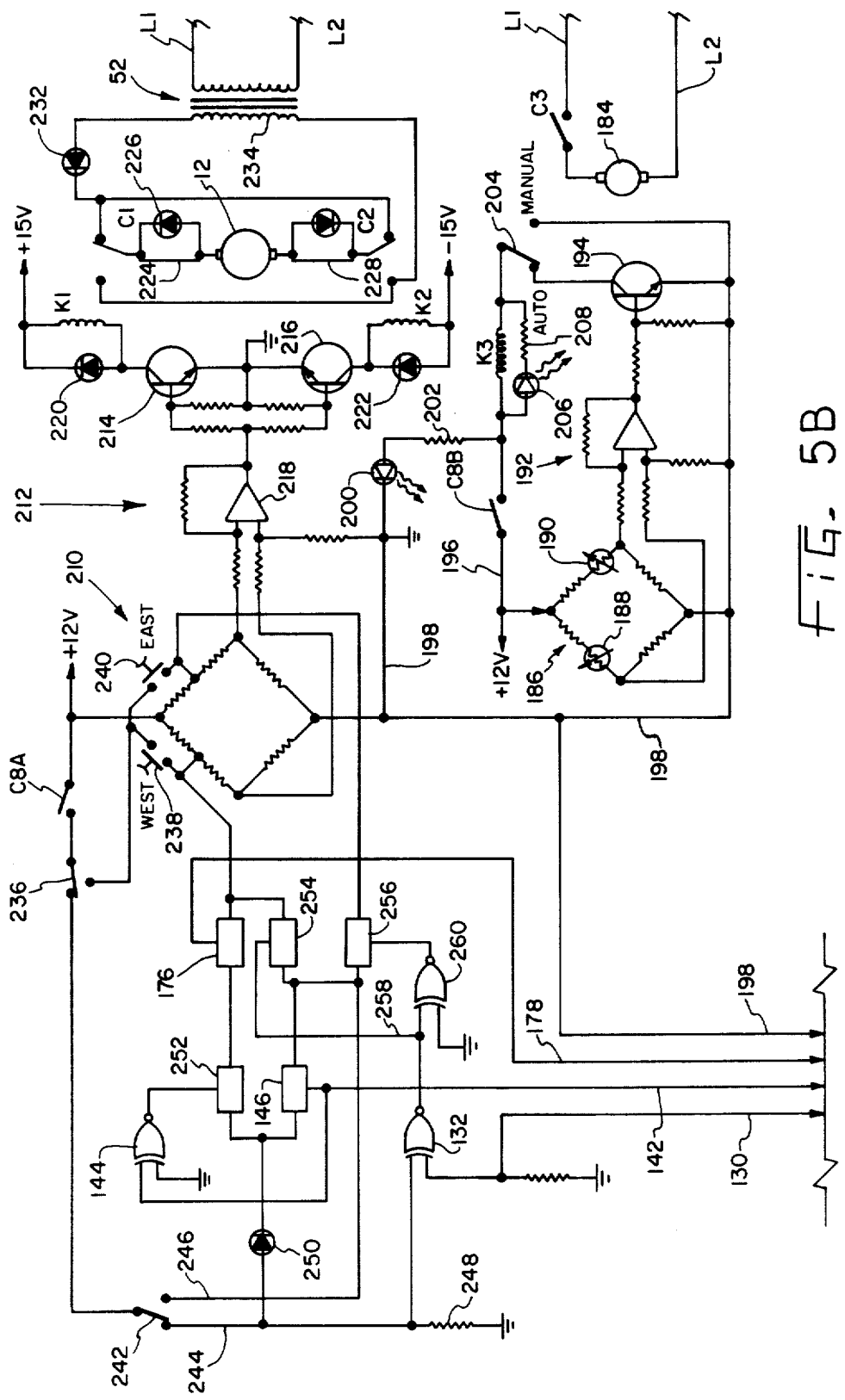

Referring now to FIGS. 5a and 5b, the electronic circuitry of the solar tracking control system will be described. Power is supplied to the solar tracking control system from a 120 volt, 60Hz outlet through two lines indicated as L1 and L2. A power supply fuse 50 is provided on L2. Transformer 52 reduces the voltage to an appropriate working voltage such as 28 volts. Full wave rectifier 54 is connected to the secondary winding of transformer 52 and provides a positive 15 volt and a negative 15-volt output. Power supply capacitors 56 and power supply resistors 58 are connected between the respective positive 15 volt output and negative 15 volt output of full wave rectifier 54 and the center tap line of transformer 52 acting as ground. A 12-volt regulator 60 is provided and is connected to the positive 15-volt output of full wave rectifier 54 and the center tap output of transformer 52. Capacitors 66 are connected between the output of regulator 60 and the center tap output of transformer 52 and, thus, a 12-volt regulated output is provided as shown.

A plurality of time dependent signals are created for triggering the various electrical components of the solar tracking control system through the use of a time controlled signal programmer means or signal programmer generally designated as 68. To this end, diode 70 is connected to the above-described 28-volt 60 Hz supply. The half-wave rectified output of diode 70 is connected in series to resistor 72 and to one of the inputs of NAND gate 74. The other input of NAND gate 74 is connected to the regulated positive 12-volt output of regulator 60. The output of NAND gate 74 is connected in series with dividers 76, 78 and 80, each of which divide by 60. Dividers 76, 78 and 80 are commonly known as presettable divide by n counters and are set at divide by 60.

Thus, the output 82 of divider 76 is one cycle per second, the output 84 of divider 78 is one cycle per minute, and the output 86 of divider 80 is one cycle per hour. The output 86 of divider 80 is connected to inverter 88 which, in turn, is connected to divider 90 having outputs of $Q_2$ at one cycle per 4 hours, $Q_3$ at one cycle per 8 hours, $Q_4$ at one cycle per 16 hours and, $Q_5$ at one cycle per 32 hours. $Q_2$, $Q_3$, $Q_4$, and $Q_5$ are shown diagrammatically in FIG. 6. Divider 90 is a seven stage binary counter and is set to divide by 24. 30 Divider 90 operates on 12 volts and can be reset by providing a signal on reset line 92. Reset line 92 is connected to the output of NAND gate 94. One input of NAND gate 94 is connected to the output of NAND gate 96 which, in turn, is connected to outputs $Q_4$ and $Q_5$ of divider 90. The other input of NAND gate 94 is connected to line 98, which is connected to normally open reset switch 100 leading to ground. Line 98 is also connected to an integrator consisting of resistor 102 and capacitor 104, which are, in turn, connected to a positive 12 volts. Thus, dividers 78, 80 and 90 can be reset by merely depressing reset switch 100. In the alternative, dividers 78, 80 and 90 are reset automatically via the output of NAND gate 94, which is dependent on the outputs $Q_4$ and $Q_5$ of divider 90.

The solar tracking control system is selectively automatically activated through the use of a power switch means generally designated as 106. Power switch means 106 includes coil K8, which is connected to and is adapted to pull closed contacts C8A and C8B. Coil K8 is activated through the use of NPN transistor 114 which, in turn, is activated through the use of a power signal generating means for generating a power signal in response to time dependent signals $Q_3$, $Q_4$, and $Q_5$ of divider 90. The power signal for activating coil K8 through the use of NPN transistor 114 is generated through the use of NOR gates 110 and 112 and inverter 108. The Boolean logic representing the system energizing and de-energizing power signal necessary to activate NPN transistor 114 is $\overline{Q_3 + Q_4} + \overline{Q_4 + Q_5}$. Resistor 116 is connected in series with the output of NOR gate 112 and resistor 118 is connected in series with the output of NOR gate 110. Resistor 120 is connected between the base of NPN transistor 114 and ground. Accordingly, through the use of the power signal generating means, a power signal is produced as shown in FIG. 6 and coil K8 is energized and contacts C8A and C8B are closed over a period of twelve hours. More specifically, as shown in FIG. 6, the power signal is high between 7 a.m. and 7 p.m., during which time the solar tracking control system is energized.

An east/west signal generating means is provided for generating an east/west signal in response to time dependent signals $Q_2$ and $Q_4$ and the output of NOR gate 112. East/west signal generating means includes NAND gate 122 having a first input of $Q_2$ and a second input of $Q_4$ from divider 90. The output of NAND gate 122 is connected to a first input of NAND gate 124. The second input of NAND gate 124 is connected to the output of NOR gate 112. The Boolean logic representing the east/west signal generation is $\overline{Q_2 \cdot Q_3 \cdot Q_4 + Q_5}$. Accordingly, the output of NAND gate 124 generates the east/west signal shown in FIG. 6.

Resistor 126 and light-emitting diode 128 are connected in series between the output of NAND gate 124 and a 12-volt supply. Accordingly, light-emitting diode 128 lights up and indicates the time during which the east/west signal is low. It should be noted that the output of NAND gate 124 or the east/west signal is connected via line 130 to one of the inputs of exnor gate 132. Thus, line 130 and the respective input of exnor gate 132 is low from 7:00 a.m. until 1:00 p.m. and high, thereafter, as more clearly shown in FIG. 6.

A fixed automatic signal is also generated through the use of a fixed automatic signal generating means in response to time dependent signals $Q_3$ and the output of NOR gate 112. More specifically, the fixed automatic signal is provided at the output of exnor gate 134 having a first input from NOR gate 136 and a second input connected to ground. NOR gate 136 has a first input connected to inverter 138 which, in turn, is connected to $Q_3$ of divider 90. The second input of NOR gate 136 is connected to inverter 140 which, in turn, is connected to the output of NOR gate 112. Thus, the fixed automatic signal, which is low from 11:00 a.m. until 3:00 p.m. and high at all other times as shown in FIG. 6, is applied to line 142 which is connected to one of the inputs of exnor gate 144 and to solid state relay, more commonly known as a field effect device 146. Thus, a low signal is provided via line 142 to solid state relay or contact 146 and to exnor gate 144 between 11:00 a.m. and 3:00 p.m. and a high signal is provided thereto at all other times. The Boolean logic representing the fixed automatic generation is $\overline{Q_3} \cdot Q_4 \cdot Q_5$. It should be further noted that light-emitting diode 148 and resistor 150 are connected in series between line 142 and a 12-volt supply thereby indicating the time of which the fixed automatic signal is low.

Figure 6A:
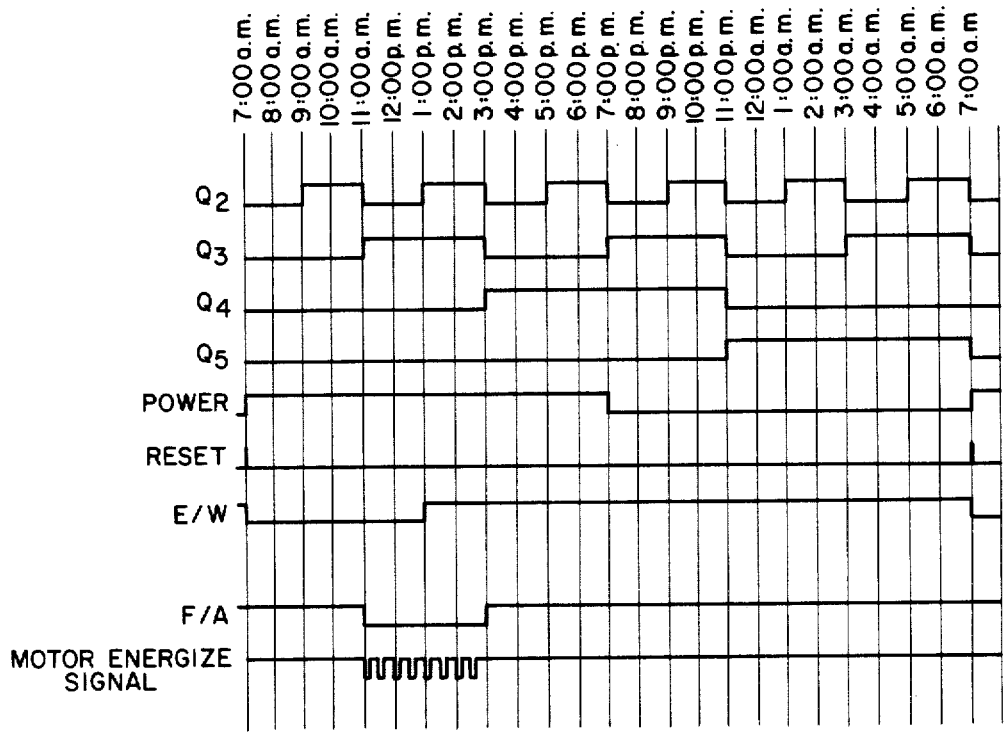
FIGS. 6a and 6b are signal diagrams generally depicting some of the various signals generated by the solar tracking control system according to the present invention.
Figure 6B:
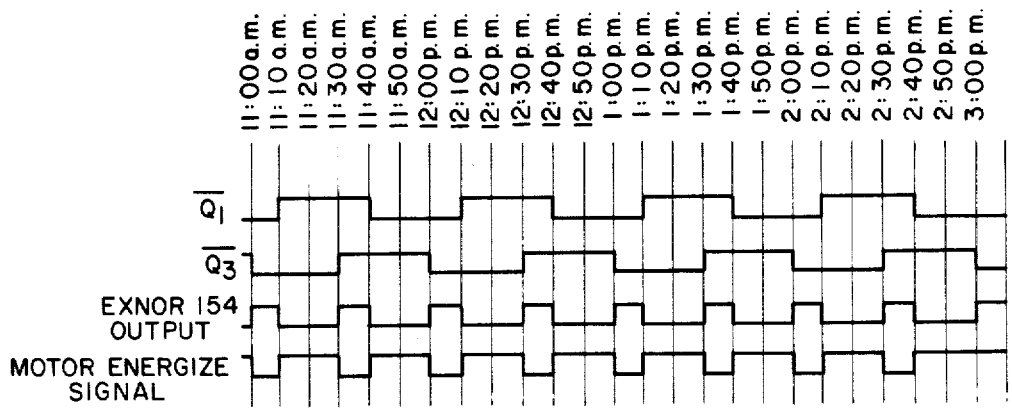

A gate means is provided for generating motor energizing signals in response to the fixed automatic signal and the motor energizing signals generated via time dependent signals $\overline{Q_1}$ and $\overline{Q_3}$ of divider 80. More specifically, the output of NAND gate 152 provides the periodic motor energizing signals as shown in FIG. 6. That is, exnor gate 154 has a first input of $\overline{Q_1}$ and a second input $\overline{Q_3}$ as more clearly shown in FIG. 6b. Exnor gate 154 has an output signal also shown in FIG. 6b and is connected to an input of NAND gate 152. The other input of NAND gate 152 is connected to inverter 156 which, in turn, is connected to the output of exnor gate 134 which provides the fixed automatic signal. Accordingly, the output of NAND gate 152 is the motor energizing signal as shown in FIGS. 6a and 6b. It should be noted that the motor energizing signal is connected to a latch means or, more particularly, to a cross coupled NAND gate cell generally indicated as 158 for the purpose of setting the same and causing motor 12 to be energized moving solar panel 10 westerly as will be described hereinbelow.

A means for detecting the degree of pivot of the solar panel and for resetting cross coupled NAND cell 158 by providing a motor de-energizing signal in response to detecting a preselected degree of pivot and, thereby, selectively stopping the westerly movement of solar panel 10 is provided. More specifically, motor 12 is mechanically coupled to a hall-effect generator 164 whereby a preset number of electrical signals are created by every predetermined number of revolutions by motor 12. Hall sensor 160 senses the signals created by generator 164 and is connected to exnor gate 166. The other input of exnor gate 166 is connected to ground. The output of exnor gate 166 is connected to synchronous programmable 4-bit counter 162. It should be noted that both hall sensor 160 and counter 162 are connected to a 12-volt supply line and ground as shown. Synchronous programmable 4-bit counter 162 is programmed to count down from a 4-bit binary digit through the use of switches generally indicated as 168 connected to a 12-volt source. Thus, when a preselected number of pulses coming from hall sensor 160 and exnor gate 166 are counted by counter 162, a reset signal is provided to reset line 170 thereby resetting cross coupled NAND cell 158. It should be noted that counter 162 also resets itself each time it provides a reset signal on line 170 via line 178. Further, through capacitors 172 and resistors 174, cross coupled NAND gate cell 158 sets and resets only upon the occurrence of a change of voltage i.e., from high to low or from low to high. More specifically, cross coupled NAND gate cell 158 is set when the motor energizing signal goes from high to low and remains set until line 170 goes from high to low. It should also be noted that the output of cross coupled NAND gate cell 158 is connected to solid state relay or contact 176 via line 178. Counter 162 is also connected to line 142 carrying the fixed automatic signal and is thereby kept in a reset position between 3:00 p.m. and 11:00 a.m. when the fixed automatic signal is high.

So as to remove the energy collected by solar panel 10 and store the same, an energy bank such as a water storage tank 180 is connected to solar panel 10. In essence, storage tank 180 is fluidly connected to solar panel 10 via water lines 182 and a water pump 184 is connected to one of the water lines 182 so as to circulate water between solar panel 10 and water storage tank 180. As shown in FIG. 5b, water pump 184 is electrically powered via lines L1 and L2 which are connected thereto and is selectively energized and de-energized through the use of contact C3, which is controlled with coil K3. Coil K3 is itself energized when the temperature of solar panel 10 exceeds the temperature of water storage tank 180 by approximately 3 degrees Fahrenheit which may be preselected. This temperature difference is sensed by using a bridge 186 having on one leg thereof storage tank thermistor 188 sensing the water temperature within storage tank 180 and on the other leg solar panel thermistor 190 sensing the water temperature within solar panel 10. The imbalance of bridge 186 is sensed and amplified through temperature control OP AMP circuit 192 which, in turn, is connected to the base of temperature control transistor 194. Transistor 194 causes coil K3 to be energized thereby pulling contact C3 and, thereby, energizing water pump 184 whenever an imbalance in bridge 186 occurs. The resistors used within bridge 186 and within temperature control OP AMP circuit 192 are sized according to general electronic standards. Further, bridge 186 is connected between 12-volt supply line 196 and line 198 connected to the center tap of transformer 52.

A contact C8B is connected to 12-volt supply line 196 and closes in response to coil K8 thereby providing power to the water pump control circuitry in response to the power signal. Light-emitting diode 200 and resistor 202 are connected in series between ground and contact C8B thereby providing a visual indication as to when power is provided to the water pump control circuitry and the solar tracking control system in general. Coil K3 is connected between contact C8B and pump manual/automatic switch 204 and light-emitting diode 206 and resistor 208 are connected in parallel with coil K3. Thus, light-emitting diode 206 provides a isual indication whenever coil K3 or water pump 184 are energized. Switch 204 is shown in the automatic position whereat coil K3 will automatically be energized upon the occurrence of an imbalance in bridge 186. In the alternative, switch 204 may be placed in the manual position whereat coil K3 and pump 184 are energized regardless of any imbalance occurrence in bridge 186.

The direction of motor 12, which is powered via a 28-volt 60 Hz supply from transformer 52, is controlled through the use of motor control bridge 210, motor control OP AMP circuit 212 and coils K1 and K2, which are controlled by transistors 214 and 216, respectively. More specifically, each input of OP AMP 218 is connected to a respective leg of motor control bridge 210. Thus, the output of OP AMP 218 is either zero, positive or negative, depending on the imbalance of motor control bridge 210. The output of OP AMP 218 is connected to the respective bases of NPN transistor 214 and PNP transistor 216. Accordingly, either coil K1 or coil K2 can be energized during any particular period of time but not both. Diode 220 is connected in parallel with coil K1 and diode 222 is connected in parallel with coil K2. The resistors of motor control bridge 210 and motor control OP AMP circuit 212 are sized according to general electrical standards.

Motor 12, on one end thereof, is connected to west limit switch 224 and diode 226 which are in parallel with each other and at the other end thereof are, in turn, connected to contact C1. At the other end thereof, motor 12 is connected to east limit switch 228 and diode 230, which are connected parallel to each other and are further connected to contact C2 at the other end thereof. Diode 232 is connected in series with secondary winding 234 of transformer 52 thereby providing rectified current to motor 12. Both contacts C1 and C2 are shown in their normally closed positions when coils K1 and K2 are not energized. West limit switch 224 and east limit switch 228 are physically situated substantially near the end of the desired pivot of solar panel 10 in the respective westerly or easterly direction and open when solar panel 10 substantially reaches that position thereby opening a respective limit switch 224 or 228 and causing motor 12 and the pivoting of solar panel 10 to stop. Thereafter, due to the open limit switch, motor 12 will operate only when the correct contact C1 or C2 closes, thereby causing motor 12 to pivot solar panel 10 in the opposite direction of that which caused the opening of the limit switch. More specifically, during normal operation, coil K1 is energized pulling closed contact C1 and causing solar panel 10 to move westerly. When solar panel 10 has been pivoted substantially to the end of the desired angle, west limit switch 224 will open and motor 12 will stop regardless of whether contact C1 is closed or open. Thereafter, only the energizing of coil K2 pulling closed contact C2 will allow motor 12 to be energized with current flowing through diode 226 and, thereby, causing solar panel 10 to move in the easterly direction. It should be noted that, in general, the same operation occurs when the substantially furthest easterly pivot is reached, however, in that position, east limit switch 228 is opened.

Connected in series with contact C8A, there is manual override solar panel control switch 236 shown in its normally closed position. Switch 236, along with west manual override switch 238 and east manual override switch 240 are provided for imbalancing bridge 210 so as to make solar panel 10 pivot in the desired direction regardless of the automatic solar tracking control system described hereinabove. That is, west manual override switch 238 is provided for imbalancing bridge 210 so as to make solar panel 10 pivot westerly and east manual override switch 240 is provided so as to imbalance bridge 210 and cause solar panel 10 to pivot easterly.

An overload determining means for determining substantially when the energy bank or storage tank 180 is substantially full or when solar panel 10 has reached a critical level or temperature and switch means connected to the above-described east/west signal generating means and the overload determining means for overriding the latch means and pivoting the solar panel away from direct sunlight in response to an overload determination and in response to the east/west signal is described hereinbelow. More specifically, temperature sensitive switch 242 is connected to manual override solar panel control switch 236 and is normally in the position shown in FIG. 5b whereat 12-volts is provided to line 244. When the temperature of storage tank 180 is below substantially 140 degrees Fahrenheit or some other preselected temperature, temperature sensitive switch 242 remains in its normal operating position as shown. Switch 242 is substantially a bimetallic strip-type thermostat situated so as to sense the temperature of the water within solar panel 10 or storage tank 180 and to provide an overtemperature control signal whenever a preselected temperature such as 140 degrees Fahrenheit is exceeded. In the alternative, temperature sensitive switch 242 can be a preset thermosnap disk control switch. Accordingly, whenever the preselected temperature is exceeded, switch 242 opens and provides 12-volts on line 246.

Line 244 is connected to one of the inputs of exnor gate 132 and to ground via resistor 248. Line 244 is also connected to diode 250 which, in turn, is connected to solid state relay 146 and solid state relay 252. It should be noted that solid state relay 146 is controlled via line 142 and solid state relay 252 is controlled via the output of exnor gate 144. The output of relay 252 is connected to the input of relay 176 which, as described hereinbelow, is controlled via line 178. The output of relay 176 is connected to the west leg of motor control bridge 210. The output of solid state relay 146 is connected to the inputs of solid state relays 254 and 256. It should be noted that line 246 is also connected to the inputs of solid state relays 254 and 256. Further, solid state relay 254 is controlled via line 258 which is the output of exnor gate 132. Line 258 is also connected to one of the inputs of exnor gate 260. The other input of exnor gate 260 is connected to ground. The output of exnor gate 260 controls solid state relay 256 which, in turn, has an output connected to the east leg of motor control bridge 210.

The operation of the solar tracking control system will be described hereinbelow. At substantially 7:00 a.m., the output of NAND gate 94 goes high and thereby resets dividers 78, 80, and 90 via reset line 92. At that point, the power signal goes high, coil K8 is closed, and contacts C8A and C8B are closed thereby providing power to the solar tracking control system and indicating the occurrence of this event via light-emitting diode 200. Simultaneously, the east/west signal on line 130 is low and the fixed automatic signal on line 142 is high. Accordingly, if temperature sensitive switch 242 is in its normal operating position as shown, the output of exnor gate 132 is low and, thus, the output of exnor gate 260 is high. Further, because the fixed automatic signal is high on line 142, the output of exnor gate 144 is low and solid state relay 146 is closed thereby allowing current to flow through diode 250, relay 146 and solid state relay 256 and to the east leg of bridge 210. Accordingly, coil K2 is energized and contact C2 is opened thereby causing solar panel 10 to move easterly until east limit switch 228 is opened.

If at 7:00 a.m., after resetting, the temperature sensitive switch is triggered and thus connected to line 246, the output of exnor gate 132 is high thereby closing solid state relay 256 and opening solid state relay 254 thereby allowing current to flow through line 246 and solid state relay 254 to the west leg of motor control bridge 210 thereby causing solar panel 10 to move westerly if not already in the westerly position until west limit switch 224 is opened.

At substantially 11:00 a.m., the fixed automatic signal goes low as shown in FIG. 6a, and the motor energize signal also goes low for a period of 10 minutes as shown in FIGS. 6a and 6b. Accordingly, cross coupled NAND gate cell 158 is set and a high signal is provided on line 178 thereby closing solid state relay 176. Further, because the fixed automatic signal carried on line 142 is low, solid state relay 146 is open and because the output of exnor gate 144 is caused to be high, solid state relay 252 is closed. Accordingly, so long as temperature sensitive switch 242 remains in its normal position as shown, current is allowed to travel through diode 250, closed relays 252 and 176, and to the west leg of motor control bridge 210 thereby energizing coil K1 and closing contact C1 energizing motor 12 and causing solar panel 10 to move in the westerly direction. As soon as motor 12 starts to rotate, however, hall sensor 160 generates pulses which travel through exnor gate 166 and are counted by counter 162. Thereafter, when a preselected number of pulses coming from hall sensor 160 are counted by counter 162, a reset signal is provided on reset line 170 thereby resetting cross coupled NAND gate cell 158 and, also, resetting counter 162 via line 178. Accordingly, line 178 then goes low thereby opening solid state relay 252 and closing solid state relay 146 and, thereby, also de-energizing motor 12 and causing solar panel 10 to stop pivoting. As can be appreciated, the above-described sequence of events whereby the cross coupled NAND gate cell 158 is set and reset occurs periodically each half hour as indicated by the motor energize signal shown in FIGS. 6a and 6b. In this fashion, because the motor energizing signal is time dependent, solar panel 10 is caused to pivot so as to be substantially always perpendicular to the sun.

It should be noted that between 7:00 a.m. and 1:00 p.m., if temperature sensitive switch 242 is caused to open and provide current to line 246, solar panel 10 will be moved in the westerly direction generally away from direct sunlight due to the low east/west signal. This is because upon such an occurrence, the output of exnor gate 132 will be high thereby closing solid state relay 254 and opening relay 256 and, thus, causing current to flow through line 246 and solid state relay 254 to the west leg of motor control bridge 210.

Between 1:00 p.m. and 7:00 p.m. however, the east/west signal on line 130 goes high so that if the temperature sensitive switch 242 opens and makes contact with line 246, the output of exnor gate 132 is low and, thus, the output of exnor gate 260 is high causing solid state relay 256 to close and solid state relay 254 to open. Accordingly, current flows through line 246 and relay 256 to the east leg of motor control bridge 210 and causes solar panel 10 to be pivoted in the easterly direction away from direct sunlight until east limit switch 228 is opened.

At 3:00 p.m., the fixed automatic signal goes high and, therefore, no further setting of cross coupled NAND gate cell 158 can occur as also shown by the motor energize signal of FIG. 6a. Further, solid state relay 146 is closed and solid state relay 252 is open. Further yet, solid state relay 254 is closed because the output of exnor gate 132 is high due to the east/west signal on line 130 being high and a voltage being provided on line 244. Accordingly, current is allowed to travel through diode 250, relays 146 and 254 to the west leg of motor control bridge 210, thereby causing solar panel 10 to travel the remainder of the way westerly until west limit switch 224 is opened. Solar panel 10 will remain in this most westerly position until the next day at 7:00 a.m. when the system is again automatically reset and solar panel 10 is caused to move to its full easterly position. It should be noted that counter 162 is reset via line 262 upon the fixed automatic signal going high.

Furthermore if, between 3:00 p.m. and 7:00 p.m., an overtemperature or overload situation occurs and temperature sensitive switch 242 is caused to provide current on line 246, the output of exnor gate 132 becomes low and the output of exnor gate 260 becomes high thereby allowing current to flow through line 246 and relay 256 to the east leg of motor control bridge 210 and thereby causing solar panel 10 to be pivoted to its full easterly fixed position until east limit switch 228 is opened.

At 7:00 p.m. the power signal goes low and contacts C8A and C8B are caused to open thereby preventing power from being supplied to the solar tracking control system until the next day at 7:00 a.m. when the system is again reset automatically. As can be appreciated at 7:00 a.m. of the next day, the above-described operation is repeated.

It should further be noted that the above-described solar tracking control system is originally set by synchronizing the signal programmer with the time of day by depressing reset switch 100 at approximately 7:00 a.m. Thereafter, as described above, the system automatically resets itself at that same time and operates without any further input from the operator.

While the invention has been described as having a specific embodiment, it will be understood that it is capable of further modifications which are equivalent thereto. This application is therefore intended to cover any variations, uses or adaptations of the invention following the general principles thereof and including such departures from the present disclosure as come within known or customary practice in the art to which this invention pertains.

What is claimed is:

1. A solar tracking control system for use in controlling the position of a pivotable solar panel connected to a motor by selectively energizing and de-energizing the motor, said control system comprising:
   signal programmer means for generating a plurality of time dependent signals;
   means connected to said signal programmer means for generating periodic motor energizing signals in response to said time dependent signals;
   means for detecting degrees of pivot of the solar panel and for providing a motor de-energizing signal in response to detecting a preselected degree of pivot; and,
   latch means connected to said detecting means and said generating means and to the motor for retaining the motor energized in response to a motor energizing signal and retaining the motor de-energized in response to a de-energizing signal.

2. The solar tracking control system of claim 1 wherein said means for detecting is a hall sensor connected to the motor and a counter connected to said hall sensor said counter providing said de-energizing signal in response to said hall sensor output.

3. The solar tracking control system of claim 1 wherein said latch means is a cross coupled NAND gate cell having two inputs and one output.

4. The solar tracking control system of claim 1 further comprising:
means for generating a fixed automatic signal; and,
gate means receiving said fixed automatic signal and said motor energizing signals and having an output connected to said latch means for providing said motor energizing signals to said latch means in response to said fixed automatic signal and said motor energizing signals.

5. The solar tracking control system of claim 1 further comprising:
east/west signal generating means for generating a time dependent signal substantially representative of the sun's position being easterly or westerly with respect to the location of the solar panel;
overload determining means for determining substantially when an overload condition exists on the solar panel; and,
switch means connected to said east/west signal generating means and said overload determining means for overriding said latch means and pivoting the solar panel away from the sun in response to an overload determination.

6. The solar tracking control system of claim 1 wherein the solar panel is connected to an energy bank for holding energy collected by the solar panels, said solar tracking control system further comprising:
east/west signal generating means for generating a time dependent signal substantially representative of the sun's position being easterly or westerly with respect to the location of the solar panel;
overload determining means for determining substantially when an overload condition exists in the energy bank; and,
switch means connected to said east/west signal generating means and said overload determining means for overriding said latch means and pivoting the solar panel away from the sun in response to an overload determination.

7. The solar tracking control system of claim 6 wherein the energy bank is a water tank and said overload determining means is a temperature sensitive switch.

8. The solar tracking control system of claim 1 further comprising:
power signal generating means for generating a power signal; and,
power switch means connected to said power signal generating means for providing electrical power to said means for generating motor energizing signals, said means for detecting the degree of pivot and said latch means in response to said power signal.

9. The solar tracking control system of claim 1 wherein the solar panel is connected to a water storage tank and a pump is connected therebetween for circulating water between the solar panel and the water storage tank, said solar tracking control system further comprising water pump energizing means for sensing the temperature of the water in the solar panel and sensing the temperature of the water in the water storage tank and for providing a water pump signal and energizing the water pump circulating the water between the solar panel and the water storage tank when the solar panel water temperature exceeds the storage tank water temperature by a preselected value.

10. A solar tracking control system for use in controlling the position of a pivotable solar panel connected to a motor by selectively energizing and de-energizing the motor, said control system comprising:
time controlled signal programmer means for generating a plurality of time dependent signals;
means connected to said signal programmer means for generating periodic motor energizing signals;
means for detecting degrees of pivot of the solar panel and for providing a motor de-energizing signal in response to detecting a preselected degree of pivot, said means for detecting including a hall sensor connected to the motor having a hall sensor output in response to the motor operation and a counter connected to said hall sensor, said counter providing said de-energizing signal in response to said hall sensor output; and,
latch means connected to said detecting means and said motor energizing signal generating means and to the motor for retaining the motor energized in response to a motor energizing signal and retaining the motor de-energized in response to a de-energizing signal.

11. The solar tracking control system of claim 10 wherein said latch means is a cross coupled NAND gate cell having two inputs and one output.

12. The solar tracking control system of claim 10 further comprising:
means for generating a fixed automatic signal connected to said signal programmer means and generating said fixed automatic signal in response to said plurality of time dependent signals; and,
gate means receiving said fixed automatic signal and said motor energizing signals and having an output connected to said latch means for providing said motor energizing signals to said latch means in response to said fixed automatic signal and said motor energizing signals.

13. The solar tracking control system of claim 10 further comprising:
power signal generating means for generating a power signal, said power signal generating means connected to said signal programmer means and generating said power signal in response to said plurality of time dependent signals; and
power switch means connected to said power signal generating means for providing electrical power to said means or generating periodic motro energizing signals, said means or detecting the degree of pivot and said latch means in response to said power signal.

14. The solar tracking control system of claim 10 wherein the solar panel is connected to an energy bank for holding energy collected by the solar panels, said solar tracking control system further comprising:
east/west signal generating means connected to said signal programmer means for generating an east/west signal in response to said plurality of time dependent signals substantially representative of the sun being east or west of the solar panel;

overload determining means for determining substantially when the energy bank is substantially full; and, switch means connected to said east/west signal generating means and said overload determining means for overriding said latch means and pivoting the solar panel away from the sun in response to an overload determination and in response to said east/west signal.

15. The solar tracking control system of claim 14 wherein the energy bank is a water tank and said overload determining means is a temperature sensitive switch.

16. The solar tracking control system of claim 10 further comprising:
east/west signal generating means connected to said signal programmer means for generating an east/west signal in response to said plurality of time dependent signals substantially representative of the sun being east or west of the solar panel;
overload determining means for determining substantially when an overload condition exists on the solar panel; and,
switch means connected to said east/west signal generating means and said overload determining means for overriding said latch means and pivoting the solar panel away from the sun in response to an overload determination and in response to said east/west signal.

17. The solar tracking control system of claim 10 wherein the solar panel is connected to a water storage tank and a pump is connected therebetween for circulating water between the solar panel and the water storage tank, said solar tracking control system further comprising water pump energizing means for sensing the temperature of the water in the solar panel and sensing the temperature of the water in the water storage tank and for providing a water pump signal and energizing the water pump circulating the water between the solar panel and the water storage tank when the solar panel water temperature exceeds the storage tank water temperature by a preselected value.

18. A method for controlling the position of a pivotable solar panel connected to a motor and having a pivot axis substantially parallel to the earth s axis of rotation, said method comprising the steps of:
(a) energizing a solar tracking control system with a switch actuated in response to a time dependent power signal and generating a plurality of time dependent signals through a signal programmer;
(b) generating a motor energizing signal in response to said time dependent signals and thereby energizing the motor and causing the solar panel to pivot about the pivot axis;
(c) detecting the degree of pivot caused through said step b;
(d) generating a motor de-energizing signal in response to detecting a preselected degree of pivot in said step c thereby causing the motor and solar panel to stop;
(e) repeating said steps b, c, and d in a time dependent manner thereby causing the solar panel to continually pivot and be substantially perpendicular to the sun; and,
(f) de-energizing the solar tracking control system in response to the time dependent power signal.

19. The method of claim 18 further comprising the steps of:
sensing the temperature of water located in the solar panel;
sensing the temperature of water in a storage water tank; and,
providing a water pump energizing signal when the solar panel water temperature exceeds the storage tank water temperature by a preselected value.

20. The method of claim 19 further comprising the steps of:
providing an overtemperature signal when the water temperature in the storage tank exceeds a predetermined value; and,
pivoting the solar panel away from direct sunlight in response to the overtemperature signal.

21. A solar tracking control system for use in controlling the position of a pivotable solar panel connected to a motor by selectively energizing and de-energizing the motor, said control system comprising:
means for generating periodic motor energizing signals;
means for detecting the degree of pivot of the solar panel and for providing a motor de-energizing signal in response to detecting a preselected degree of pivot;
latch means connected to said detecting means and said generating means and to the motor for retaining the motor energized in response to a motor energizing signal and retaining the motor de-energized in response to a de-energizing signal; and,
wherein said means for detecting is a hall sensor connected to the motor and a counter connected to said hall sensor said counter providing said de-energizing signal in response to said hall sensor output.

22. A solar tracking control system for use in controlling the position of a pivotable solar panel connected to a motor by selectively energizing and de-energizing the motor, said control system comprising:
means for generating periodic motor energizing signals;
means for detecting the degree of pivot of the solar panel and for providing a motor de-energizing signal in response to detecting a preselected degree of pivot;
latch means connected to said detecting means and said generating means and to the motor for retaining the motor energized in response to a motor energizing signal and retaining the motor de-energized in response to a de-energizing signal; and,
wherein said latch means is a cross coupled NAND gate cell having two inputs and one output.

23. A solar tracking control system for use in controlling the position of a pivotable solar panel connected to a motor by selectively energizing and de-energizing the motor, said control system comprising:
means for generating periodic motor energizing signals;
means for detecting the degree of pivot of the solar panel and for providing a motor de-energizing signal in response to detecting a preselected degree of pivot;
latch means connected to said detecting means and said generating means and to the motor for retaining the motor energized in response to a motor energizing signal and retaining the motor de-energized in response to a de-energizing signal;
means for generating a fixed automatic signal; and,
gate means receiving said fixed automatic signal and said motor energizing signals and having an output connected to said latch means for providing said motor energizing signals to said latch means in response to said fixed automatic signal and said motor energizing signals.

* * * * *

UNITED STATES PATENT AND TRADEMARK OFFICE
CERTIFICATE OF CORRECTION

PATENT NO. : 4,794,909

DATED : January 3, 1989

INVENTOR(S) : Glenn E. Eiden

It is certified that error appears in the above-identified patent and that said Letters Patent is hereby corrected as shown below:

Col. 1, line 42, change "ahd" to --and--.

Col. 2, line 26, change "deenergized" to --de-energized--.

Col. 6, line 10, delete "30".

Col. 6, line 40, change "$\overline{Q_3+Q_4}+\overline{Q_4+Q_5}$" to --$\overline{\overline{Q_3+Q_4}+\overline{Q_4+Q_5}}$--.

Col. 6, line 57, change "$Q_4$" to --$Q_3$--.

Col. 6, line 61, change "$\overline{Q_2 \cdot Q_3} \cdot \overline{Q_4+Q_5}$" to --$\overline{\overline{Q_2 \cdot Q_3} \cdot \overline{Q_4+Q_5}}$--.

Col. 7, line 26, change "$\overline{Q_3 \cdot Q_4 \cdot Q_5}$" to --$\overline{Q_3 \cdot \overline{Q_4 \cdot Q_5}}$--.

Col. 8, line 64, change "isual" to --visual--.

Cl. 13, line 56, change "motro" to --motor--.

Cl. 13, line 57, change "or" to --for--.

Cl. 18, line 44, change "earth s" to --earth's--.

Signed and Sealed this

Twelfth Day of September, 1989

Attest:

DONALD J. QUIGG

Attesting Officer

Commissioner of Patents and Trademarks